United States Patent [19]

Ohtsuga et al.

[11] Patent Number: 4,684,556
[45] Date of Patent: Aug. 4, 1987

[54] TUBULAR LINING MATERIAL FOR PIPE LINE

[75] Inventors: Hisao Ohtsuga; Akio Morinaga, both of Kanagawa; Yoichi Sakaguchi, Tokyo; Masakatsu Hyodo; Isaburo Yagi, both of Osaka, all of Japan

[73] Assignee: Tokyo Gas Co., Ltd., Tokyo, Japan

[21] Appl. No.: 701,209

[22] Filed: Feb. 13, 1985

[30] Foreign Application Priority Data

Feb. 14, 1984 [JP] Japan .................. 59-20033[U]

[51] Int. Cl.$^4$ ............................. F16L 55/18
[52] U.S. Cl. ...................... 428/36; 428/245; 138/97; 138/124; 138/125; 139/387 R
[58] Field of Search ............ 138/97, 98, 123–126; 139/387 R; 428/36, 245

[56] References Cited

U.S. PATENT DOCUMENTS 2,977,839 4/1961 Koch .......................... 138/123
4,191,218 3/1980 Clark et al. ............... 139/387 R
4,340,091 7/1982 Skelton et al. ............ 139/387 R

FOREIGN PATENT DOCUMENTS 717814 9/1965 Canada ....................... 138/125

Primary Examiner—John E. Kittle
Assistant Examiner—James J. Seidleck
Attorney, Agent, or Firm—Birch, Stewart, Kolasch & Birch

[57] ABSTRACT

A tubular lining material for pipe lines having a relatively large inner diameter and possibly a plurality of bends or curved portions, which comprises a tubular textile jacket made of warps and a weft knitted or woven in a tubular form overlaid with an air-impervious coating of a flexible synthetic resin and is applicable onto the inner surface of a pipe line which has a relatively large inner diameter and may have a plurality of bends or curved portions in such manner that the tubular lining material with a binder on the inner surface thereof may be inserted into the pipe line and allowed to advance within the pipe line with or without the aid of a leading rope-like elongated material while turning the tubular lining material inside out under fluid pressure thereby applying the tubular lining material onto the inner surface of the pipe line with the binder being interposed between the pipe line and the tubular lining material, characterized in that the warps are comprised of crimped yarns of polybutylene terephthalate fibers and the weft is comprised of a yarn of synthetic fibers. This tubular lining material is improved in biaxial stretchability, especially in lengthwise direction and has high flexibility and consistency so that the tubular lining material can be impregnated with a sufficient amount of a binder and applied onto the inner surface of the pipe line in good compliance with the shape of the inner surface without forming wrinkles or narrowing the flow path in bends or curved portions of the pipe line.

12 Claims, 4 Drawing Figures

4,684,556

TUBULAR LINING MATERIAL FOR PIPE LINE

BACKGROUND OF THE INVENTION

1. Field of the Invention

The present invention relates to a new tubular lining material for pipe lines, especially underground pipe lines having a relatively large inner diameter, which comprises a specific tubular textile jacket overlaid on the external surface thereof with an air-impervious coating of a flexible synthetic resin. More particularly, the present invention relates to a new tubular lining material for pipe lines which comprises a tubular textile jacket made of crimped yarns of polybutylene terephthalate fibers as warps and a crimped yarn of synthetic fibers as the weft knitted or woven in a tubular form overlaid with an air-impervious coating of a flexible synthetic resin and which is suitable for reinforcing underground pipe lines such as gas conduits, city water pipes, sewage pipes, petroleum pipe lines and pipes enclosing power transmission wires or telecommunication cables.

2. Description of the Prior Art

From the past, superannuation or damage of underground pipe lines often causes dangerous leakage of combustible fluids or electricity and unexpected flood, thus resulting in accidents and traffic disturbance. When such pipe lines are buried in the ground, damage of the underground pipe lines caused by external force or superannuation will induce an extremely dangerous burst of gas or water. Especially, in case of rupture of the underground pipe lines caused by superannuation, it usually occurs suddenly and is not predictable. On the other hand, only one effective countermeasure in the past was available to prevent such troubles which was to dig up the superannuated or damaged pipe lines over the respective length in the order of several ten or hundred meters for replacing them with new ones. During this pipe-exchange work, people experience much trouble since supply of gas, city water or fuel is discontinued and even traffic is limited where the pipe lines are buried below the public roads. In this case, much labor and cost are required for the pipe-exchange work in addition to the difficulty in the work itself. Under such circumstances, a pipe-lining method was proposed for attaining the purpose of repairing damaged portions of the pipe lines or previously reinforcing them so as to withstand mechanical shock. This pipe-lining method attracted commercial interest at the time because there was no necessity of digging up the pipe lines already constructed. In this method, however, the treatment for lining pipe lines is rather primitive and the step for inserting a flexible plastic tube into the underground pipe lines is extremely difficult so that the operation is almost impossible in such place where the pipe lines are long or curved.

With an attempt to overcome such drawbacks, various improvements were made in both aspects of the pipe-lining method and the lining materials used therein. In an improved pipe-lining method developed for such situations, a flexible tube is inserted into a pipe while turning the tube inside out under pressure of a fluid, such as compressed air and bonded at the same time onto the inner surface of the pipe by the aid of a binder. A method of this type is disclosed in U.S. Pat. Nos. 2,794,785, 3,132,062, 3,230,129 and 3,494,813 and British Patent Nos. 1,002,131, 1,069,623 and 1,025,011. However, these methods were still not satisfactory for the actual pipe-lining treatment for at least one of the following reasons: First, the binder having an extended pot life is required so that the time necessary for the lining treatment becomes inevitably long; Secondly, the quantity and distribution of the binder cannot be controlled so that the binder may be applied unevenly. In addition, the binder must be used in large excess but such excess amount of the binder is, after all, discarded; Thirdly, when the pipe line is inclined, the head pressure of the binder acts on the top or turning point of the tube where evagination occurs so that the pressure fluctuates and the amount of the binder tends to vary. Recently proposed in the above mentioned circumstances are the inventions disclosed in U.S. Pat. Nos. 4,334,943 and 4,368,091 relating to methods and apparatus for lining pipe lines. Especially, the method disclosed in U.S. Pat. No. 4,334,943 is most excellent in the existing pipe-lining methods and is characterized by using a specific rope-like elongated material attached to the same terminal end of the tubular lining material, as another rope-like elongated material and previously passed through the tubular lining material beyond its full length is drawn from the opposite end of the pipe line. As is evident from comparison between FIGS. 4(a) through 4(f) and FIGS. 5(a) through 5(f) given in U.S. Pat. No. 4,334,943, the use of the specific rope-like elongated material drawn from the opposite end of the pipe line is indeed significant in the pipe-lining operation so that the operation can be carried out smoothly without any difficulty as compared with the prior art approaches under a relatively low pressure even in case the pipe line is as long as 1,000 meters or it has a number of curved portions such as bends, elbows and/or offset bends. On the other hand, an improvement has also been made in the tubular lining materials per se with the development of the pipe-lining methods. Initially proposed as a material for lining pipe lines is a tubular plastic material made of a synthetic resin. Such tubular plastic material was directly inserted into a pipe and inflated and bonded onto the inner surface of the pipe by the aid of a binder under inner pressure. However, it was extremely difficult to pass this tubular plastic material directly through a pipe having curved or bent portions. In case this plastic lining material is allowed to pass through a pipe line according to the conventional tube-evaginating method, such plastic lining material tends to broken under pressure when the material is rigid, or alternatively tends to become uneven in thickness under pressure when the material is flexible. In addition, such plastic material is incompatible with a certain kind of a binder so that the binder can hardly be applied evenly onto the whole surface of the plastic lining material. In Japanese Laid-open Utility Model Appln. No. 56-3619, there is disclosed an improved tubular lining material for pipe lines. This lining material comprises a tubular textile jacket with an air-impervious coating of a synthetic resin, which has been knitted or woven in a tubular form with warps and a weft made of synthetic fibers such as polyester filament yarns. This tubular lining material is applied onto the inner surface of a pipe line according to the above-mentioned conventional tube-evaginating method wherein the tubular lining material is allowed to advance within the pipe line and evaginated at the same time under pressure while being bonded to the inner surface of the pipe line by the aid of a binder. In this case, insertion of the lining material into the pipe line is smoothly attained within a short period of time by evagination under pressure and a sufficient amount of the binder is maintained in the interstices of the reticular structure of the textile jacket so that the bonding of the lining material onto the inner surface of the pipe line is assured. In addition, the innermost wall of the lining material is constructed by the air-impervious coating of a synthetic resin as a result of evagination, thus functioning equivalently as a plastic lining material. An elastic polyester resin such as Hytrel (Du-Pont, U.S.A.) or Pelprene (Toyobo, Japan) is preferably used as the synthetic resin. The warps and weft may be made of other synthetic fibers such as polyamide fibers, vinylon fibers or of inorganic fibers such as glass fibers. A similar tubular lining material is also disclosed in Japanese Laid-open Patent Appln. No. 56-8229, which is applied to a pipe line according to the conventional tube-evaginating methods. This tubular lining material is constructed by a similar tubular textile jacket and a similar coating of a synthetic resin but is stretchable by 10–20% in the peripheral direction and non-stretchable in the longitudinal direction on evagination by pressurized fluid. Because of its stretchability in the peripheral direction, this tubular lining material can easily be inserted into the pipe line and applied onto the inner surface of the pipe line by evagination under pressure. A tubular lining material disclosed in these prior art references is composed of a tubular textile jacket knitted or woven with synthetic fibers and possesses high tenacity in both the longitudinal and peripheral directions. Thus, the material is not damaged when evaginated under pressure and thus has widely been utilized in the conventional pipe-lining methods. In fact, the tubular lining material of this type can be applied to long pipe lines without any problem so far as they are straight. As it lacks stretchability in the longitudinal direction, however, it often forms wrinkles or a narrow flow path in a bend portion of the pipe line where the length of the outer curvature is different from that of the inner curvature, as shown in FIGS. 4(d)–4(f) of U.S. Pat. No. 4,334,943 when used according to a conventional pipe-lining method.

In order to overcome such drawbacks, a new type tubular lining material was recently proposed in U.S. Pat. No. 4,576,205, which is not only expansive in the peripheral direction (i.e. stretchable in transverse direction) but also stretchable in the longitudinal direction. In this tubular lining material, a part or all of warps constructing the tubular textile jacket are comprised of a polyurethane elastic yarn (Spundex yarn) around which, over the full length thereof, a synthetic fiber yarn or yarns have been coiled. This tubular lining material is indeed excellent in biaxial stretchability and applicable satisfactorily to pipe lines with a number of curved portions or bends, showing good compliance with the complicated shape in the curved portions or bends when the lining material is used according to a pipe-lining method as disclosed in U.S. Pat. No. 4,334,943. However, such polyurethane elastic yarns are relatively expensive so that the use of a large quantity of a tubular lining material based on such polyurethane elastic yarns for pipe lines for general use is not advantageous for an economical reason. In general, it is extremely difficult to manufacture a polyurethane elastic yarn of a large diameter. Thus, the lining material proposed in U.S. Pat. No. 4,576,205 has a relatively small diameter and is particularly suitable for reinforcing a pipe line of a relatively small diameter (usually for a service pipe line having a nominal diameter of 1 inch for use in homes, shops and small offices). Considering the nature of such polyurethane elastic yarn, it is rather difficult to manufacture a tubular lining material with a relatively large diameter (larger than 50 mm) from such polyurethane elastic yarns. In addition, the polyurethane elastic yarn is composed of monofilament and becomes inferior in flexibility when processed to a tubular lining material with a relatively large diameter. Further, the polyurethane elastic yarn around which a crimped yarn or yarns of synthetic fibers have been coiled becomes less consistent so that it may not take up a sufficient amount of a binder required for lining pipe lines with a relatively large diameter.

On the other hand, a main city gas conduit or a medium city water pipe generally has a diameter within a range from 50 mm to 400 mm. With a view to preventing pipe lines with such a relatively large diameter from any dangerous burst of gas, water or a combustible fluid caused by unexpected damage of such pipe lines, it is necessary to reinforce such pipe lines with a tubular lining material at least comparable in reinforcing performance with that based on the polyurethane elastic yarn around which a crimped yarn or yarns have been coiled. However, a new economical tubular lining material comparable in quality with that based on the expensive polyurethane elastic yarns and desirable for reinforcing such relatively large pipe lines has not yet been proposed.

Under these circumstances, there is a great demand for developing a new economical tubular lining material which can be applied to pipe lines having an inner diameter of 50–400 mm and a number of bends or curved portions, without permitting occurrence of any wrinkle or narrow flow path in curved or bent portions.

SUMMARY OF THE INVENTION

Accordingly, it is an object of the present invention to provide a new tubular lining material for pipe lines having a relatively large inner diameter and possibly a number of bends or curved portions therein.

It is another object of the present invention to provide a new economical tubular lining material for pipe lines with a relatively large inner diameter, which can be manufactured easily according to a simple manner.

It is still another object of the present invention to provide a new tubular lining material which can be applied without formation of wrinkles onto the inner surface of pipe lines with a relatively large inner diameter and possibly a number of curved or bent portions.

It is a further object of the present invention to provide a pipe-lining material comprising a tubular textile material with an air-impervious coating of a synthetic resin on the external surface thereof which has been knitted or woven in a tubular form with warps comprised of crimped yarns of polybutylene terephthalate fibers and a weft comprised of a crimped yarn of synthetic fibers. It is still a further object of the present invention to provide a tubular lining material applicable according to any of the conventional pipe-lining methods to pipe lines having a relatively large inner diameter and a plurality of bends or curved portions. Other objects, features and advantages of the present invention will become apparent more fully from the following description.

As a result of the present inventors' study for developing new tubular lining materials, it has now been found surprisingly that the lining treatment of pipe lines having a relatively large inner diameter with a tubular lining material having an air-impervious coating of a flexible synthetic resin on the external surface thereof can be attained smoothly and satisfactorily according to any of the conventional pipe-lining methods by an improvement made in the tubular textile jacket wherein crimped yarns of polybutylene terephthalate fibers are used as warps and a crimped yarn of synthetic fibers is used as a weft. The present invention has been accomplished on the basis of the above finding.

DETAILED DESCRIPTION OF THE INVENTION

In accordance with the present invention, therefore, there is provided a tubular lining material for pipe lines possibly having a plurality of bends or curved portions therein, which comprises a tubular textile jacket made of warps and a weft knitted or woven in a tubular form overlaid with an air-impervious coating of a flexible synthetic resin and is applicable to the inner surface of the pipe lines in such a manner that the tubular lining material with a binder onto the inner surface thereof is inserted into the pipe line and allowed to advance within the pipe line with or without the aid of a leading rope-like elongated material while turning the tubular lining material inside out under fluid pressure thereby applying the tubular lining material onto the inner surface of the pipe line with the binder being interposed between the pipe lines and the tubular lining material, characterized in that the warps are comprised of crimped yarns of polybutylene terephthalate fibers and the weft is comprised of a yarn of synthetic fibers.

BRIEF DESCRIPTION OF THE DRAWINGS

The present invention can more fully be understood from the following description taken in conjunction with the accompanying drawings in which.

Figure 1:
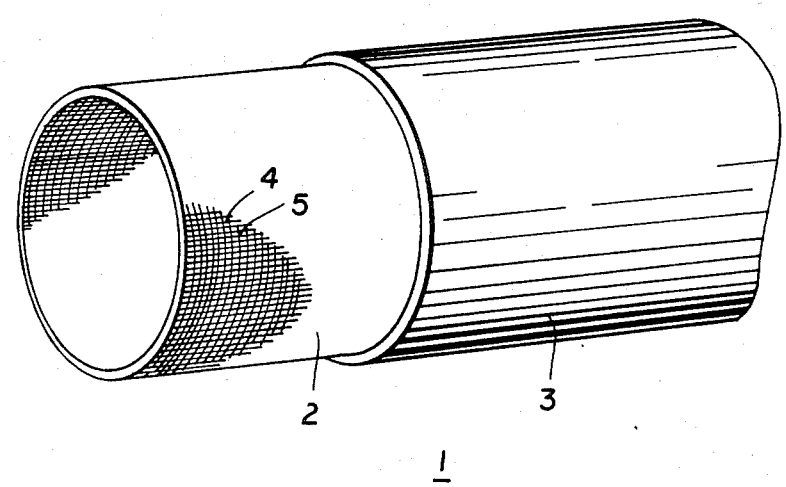
FIG. 1 is a schematic partially broken perspective view of one example of the tubular lining material of the present invention.

The tubular lining material of the present invention can be applied onto the inner wall of various kinds of pipe lines having a relatively large inner diameter and possibly a number of bends or curved portions therein for the purpose of reinforcement of the pipe lines against external shock or superannuation according to any of the conventional pipe-lining methods, preferably those as disclosed in U.S. Pat. Nos. 4,334,943 and 4,368,091, wherein the tubular lining material is evaginated and bonded to the inner surface of pipe lines while being passed within the pipe lines under fluid pressure with or without the aid of a leading rope-like elongated material such as a rope or belt itself for drawing the lining material from the opposite end of the pipe lines.

Examples of the pipe lines to be reinforced with the tubular lining material of the present invention are those having an inner diameter of about 30–400 mm, preferably 50–300 mm, including those made of steel or the like metal or alloys such as main city gas conduits and petroleum or fuel pipe lines; asbestos or rigid resinous pipes such as city water pipes of medium size, pipes for power transmission wires and pipes for telecommunication cables; and concrete or porcelain pipes such as home sewage pipes. These pipe lines may have a number of bends or curved portions therein.

In a broader sense, polybutylene terephthalate which is a polycondensate of butylene glycol with terephthalic acid may be included in the term "polyester" widely defined but is apparently distinguished from the ordinary term "polyester" normally used for polyesters derived from ethylene glycol. A polyester of ethylene glycol series which is most similar to polybutylene terephthalate is polyethylene terephthalate. However, polybutylene terephthalate fibers are certainly specific even in comparison with polyethylene terephthalate fibers since the former is exceptionally superior to the latter in elasticity and ranks between polyurethane elastic fibers and polyamide fibers derived from Nylon 6. The polybutylene terephthalate fibers are equivalent in flexibility and resistance to weathering action and chemicals to polyethylene terephthalate fibers. The high elasticity of the polybutylene terephthalate fibers is ascribable to the fact that the tetramethylene chains in the molecule are tolerant to external tension and loosening, accompanying a reversible crystalline transition from/to alpha-form to/from beta-form. Thus, the polybutylene terephthalate fibers are slightly inferior in elasticity but are economical and superior in tenacity, anti-weathering resistance and chemicals-resistance to the polyurethane elastic fibers such as Spundex.

The polybutylene terephthalate (referred to hereinafter simply as PBT) fibers are, as described above, distinguished by their significantly high elasticity in comparison with ordinary polyester fibers of ethylene glycol series, such as polyethylene terephthalate fibers. It has now been found that such difference in elasticity can be made more significant by processing the PBT fibers to crimped yarns. More particularly, crimped yarns of the PBT fibers have an increased stretchability in terms of crimp constriction, as compared with crimped yarns of polyester fibers. The crimped yarn of the PBT fibers has a crimp constriction value of 60–80% while that of the ordinary polyester fibers has a crimp constriction value of about 50% maximum. The crimp constriction in terms of percentage is calculated on a hank of a yarn with 1,000 denier according to the following equation:

Percent crimp constriction = $(L_2 - L_1)/L \times 100$

L: the original length
$L_1$: the length under the load of 10 g
$L_2$: the length under the load of 1,000 g.

The tubular lining material of the present invention is characterized by selecting crimped yarns of PBT fibers, which are excellent in elasticity and stretchability as compared with crimped yarns of the ordinary polyester fibers, as warps and, if necessary, as both warps and weft constituting the tubular textile jacket. The PBT fibers are easily commercially available and can be processed to crimped yarns according to a conventional method. Crimped yarns of the PBT fibers are also commercially available. A typical example of the commercially available PBT fibers is ARTLON (Kurashiki Rayon Co., Japan). A yarn, preferably a crimped yarn, made of various synthetic fibers can be used as weft. An example of the weft is a yarn made of vinylon, polyamide, polyester or a blend of these, with the yarn made of polyester being preferable because of its high tenacity. When the pressure-resisting property is required for the tubular lining material, a yarn made of polyethylene terephthalate fibers is suitably used as weft. In case of using a crimped yarn made of the synthetic fibers as weft, the stretchability of the tubular lining material in transverse or peripheral direction can be improved so as to comply with expansion of the material in the peripheral direction. The use of a yarn made of PBT fibers as weft warrants a sufficiently high stretchability in biaxial directions. The use of a crimped yarn made of PBT fibers will enhance this effect. In general, the use of a crimped yarn is preferable also in other aspects; such crimped yarn used as weft can be entangled with the warps and improves adhesion of an air-impervious coating of a synthetic resin to the woven tubular textile jacket. As the crimped yarn made of PBT fibers is greater in stretchability than the crimped yarn made of polyester fibers, the folding width of the tubular textile jacket can be reduced and no heat treatment is necessary for the tubular textile jacket for shrinking it in lateral direction.

In the manufacture of the tubular textile jacket, the warps and the weft have to be woven or knitted in a tubular form. A tubular textile jacket made of a strip of fabric by sewing forms a seam line in the longitudinal direction so that the jacket cannot be coated evenly with a synthetic resin and cannot be applied with an even thickness onto the inner surface of the pipe lines. Further, stretchability in both lengthwise and transverse directions of the tubular lining material becomes inferior A synthetic resin used for providing the exterior surface of the tubular textile jacket with an air-impervious resinous coating must be flexible and freely stretchable since the tubular textile jacket is biaxially stretchable. In addition, the synthetic resin must be furnished with an abrasion-resisting property tolerant to external force required for evagination of the tubular lining material and with low frictional resistance. Examples of the utilizable synthetic resin include a polyester elastomer and a polyether polyurethane elastomer. The polyester elastomer is a block copolymer of an aromatic polyester and an aliphatic polyetherdiol and is regarded as a thermoplastic synthetic resin which is flexible and air-impervious and excellent in elasticity and resisting properties. The polyether polyurethane elastomer is derived from a similar polyetherdiol and a polyisocyanate and possesses similar characteristics. These synthetic resins should have a tensile strength of at least 150 kg/cm and an elongation on tearing of 500% or more since low tensile strength often causes the formation of pinholes in the coating. Examples of the synthetic resin commercially available in this art include Pelprene (Toyobo, Japan) and Hytrel (DuPont, U.S.A.). The thickness of the coating varies according to the intended purpose and size or inner diameter of the pipe lines to be treated and the sorts of fluids to be passed therethrough, but is usually within the range from about 0.5 mm to about 3 mm.

FIG. 1 is a schematic perspective view of one example of the tubular lining material in inflated form which is partially cut away to expose the tubular textile jacket. In appearance, the tubular lining material of the present invention is identical with that of any of the prior arts. In FIG. 1, the tubular lining material 1 is composed of a tubular textile jacket 2 provided on the outer surface thereof with an air-impervious coating 3 of a flexible synthetic resin. The coating 3 may be transparent to show the condition of the tubular textile jacket 2 but may be colored according to the intended use of the lining material 1. The diameter of the tubular lining material 1 is normally slightly smaller than that of the pipe line to be reinforced thereby, as will be detailed hereinafter.

Figure 2:
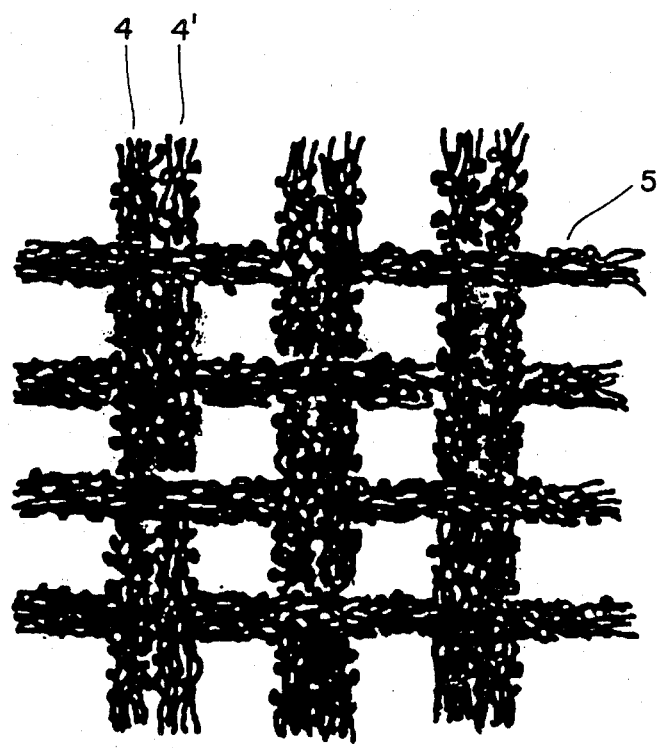
FIG. 2 is a schematic partially enlarged plane view of the tubular textile jacket used in the tubular lining material shown in FIG. 1.

In FIG. 2 showing one example of the structure of the tubular textile jacket, each warp consists of two crimped yarns 4 and 4' of PBT fibers and each weft consists of one crimped yarn 5 of synthetic fibers. Each warp may consist of one crimped yarn or 3 crimped yarns of PBT fibers and each weft may consist of a normal, i.e. non-crimped yarn of a synthetic fibers or a crimped yarn of PBT fibers according to the intended purpose. More specifically, for example, each warp in this tubular textile jacket consists of two crimped yarns of PBT fibers each made by twisting ten 150 denier PBT crimped filaments and each weft is made by twisting four 500 denier woolly polyethylene terephthalate filaments.

Figure 3:
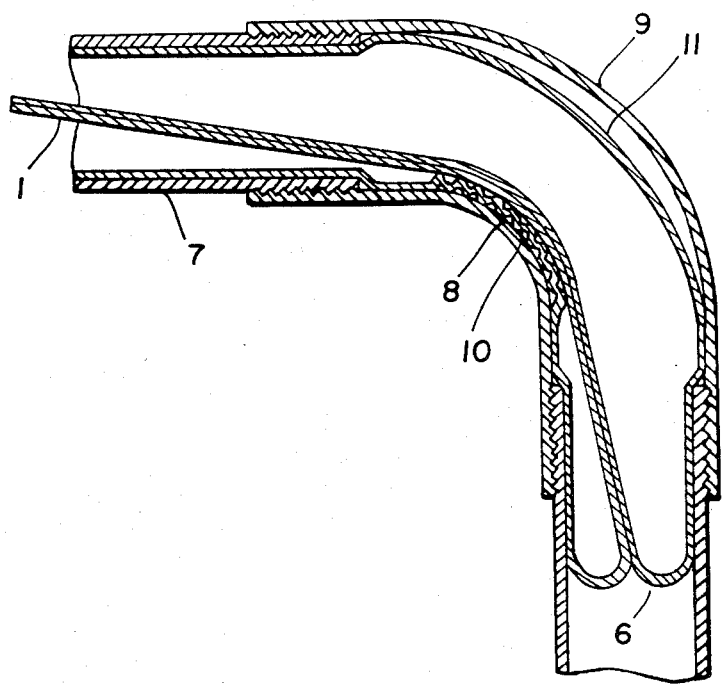
FIG. 3 is a schematic section view showing the state of lining a bend of the pipe line with a conventional tubular lining material inferior in stretchability in the longitudinal direction.

In FIG. 3 showing the state of lining a bend of a pipe line with a conventional prior art tubular lining material according to a pipe-lining method disclosed, for example, in U.S. Pat. No 4,368,091, the tubular lining material 1 is allowed to pass through a pipe line whereby the tubular lining material 1 is evaginated at the front end 6 thereof and then bonded to the inner surface of the pipe line by the aid of a binder (not shown). When the lining material 1 is passed through a straight portion 7 of the pipe line, the lining operation proceeds smoothly. In a bend of the pipe line where the length of the inner curvature 8 is shorter than that of the outer curvature 9 and the horizontal direction of the advancing lining material is rapidly changed to the downward vertical direction in the drawing, the lower part of the lining material is strongly pressed on the curved inner wall 8 of the bend to form a number of wrinkles 10 in the lining material in contact with the inner wall 8. On the other hand, the upper part of the lining material is allowed to pass rapidly along the long outer curvature so that the outer surface of the evaginated lining material can no longer be kept in good compliance with the inner surface of the outer curvature 9 to form a space 11 between the inner surface of the outer curvature 9 and the curved lining material. At the end of the curvature, the tubular lining material 1 is again kept in good compliance with the inner surface of a straight portion of the pipe line so that the lining operation is carried out smoothly. In the bend of the pipe line, therefore, a number of wrinkles 10 are formed in the lining material along the inner curvature and moreover the flow path becomes narrower.

Figure 4:
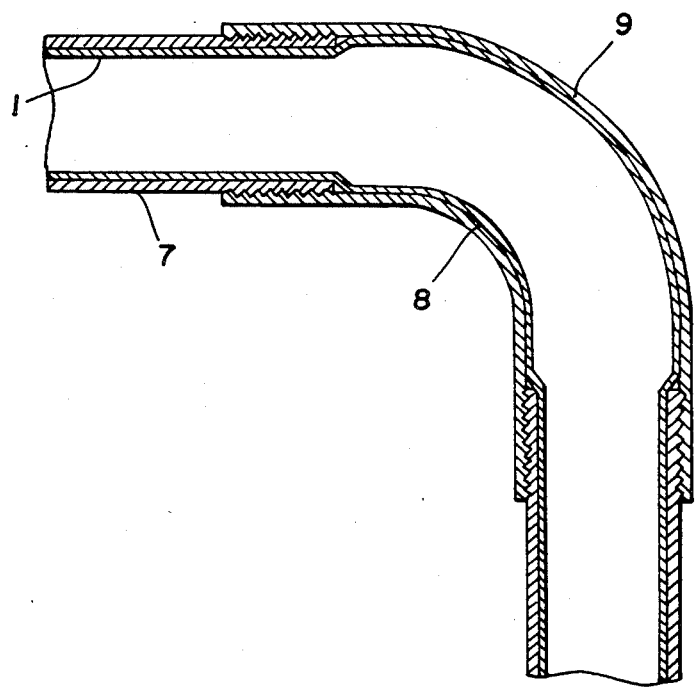
FIG. 4 is a schematic section view showing the state of lining a bend of the pipe line with the tubular lining material of the present invention superior in stretchability in the longitudinal direction.

In FIG. 4 showing the state of lining a bend of a pipe line with the tubular lining material of the present invention according to the same pipe-lining method as in FIG. 3, the lining material 1 is smoothly evaginated and evenly bonded onto the inner surface of the straight portion 7 of the pipe line without any problem. When the lining material is passed through the bend where the length of the outer curvature 9 is greater than that of the inner curvature 8, the lining material is sufficiently stretchable in lengthwise direction so that the upper part of the lining material along the outer curvature shows good compliance with the increased length of the outer curvature 9 while the lower part of the lining material along the shorter length of the inner curvature 8 passed through the bend, without forming any wrinkle or a space narrowing the flow path in the bend.

As is evident from comparison of FIGS. 3 and 4, pipe lines can be lined with the tubular lining material of the present invention without any trouble even in a bend of the pipe line.

The outer diameter of the tubular lining material must be slightly smaller (80–100%) than the inner diameter of the pipe line. If the outer diameter is too small, it will be necessary to expand the tubular lining material significantly on evagination whereby stress of the coating on the tubular textile jacket becomes larger so that necessity of increasing the fluid pressure and incidental possibility of forming pinholes in the coating may occur. On the other hand, if the outer diameter is larger than the inner diameter of the pipe line to be treated, wrinkles in longitudinal direction will be formed in the lining material, thus failing to attain application of the lining material evenly onto the inner surface of the pipe line.

In a preferred example of the tubular lining material for reinforcing a pipe line having a nominal diameter of 100 mm, a tubular textile jacket was made of 598 warps, each comprised of two crimped yarns each of which was made by twisting ten 150 denier polybutylene terephthalate crimped filaments and a weft made by twisting four 500 denier woolly polyethylene terephthalate filaments and picked up at 55 pick count/10 cm. The resultant tubular textile jacket was subjected to a relaxing treatment where the jacket was treated with hot water at about 100° C., steam or hot blast. The tubular textile jacket thus treated had a peripheral expansion of 11.0%, and elongation in the lengthwise direction of 20.6% under a pressure of 1.0 kg/cm and an elongation on tearing of about 70%.

For comparison, a tubular textile jacket was made of 300 warps each made by twisting three 1100 denier polyester filaments and a weft made by twisting a 110 denier polyester filament yarn and 20 count number polyester spun yarn and picked up at 58 pick count/10 cm. A tubular lining material manufactured from this tubular textile jacket had an elongation in the peripheral direction of 10.1% and an elongation in the lengthwise direction of −0.2% under a pressure of 1.0 kg/cm$^2$ and an elongation on tearing of about 16%, thus showing a poor elongation especially in the lengthwise direction.

In an actual pipe-lining treatment for a pipe line of 50 mm in diameter, a tubular textile jacket was made of 300 warps each made by twisting five 150 denier PBT crimped filaments and a weft made by twisting three 150 denier PBT crimped filaments together with three 150 denier woolly polyester filaments and picked up at 8 pick count/inch. This tubular textile jacket was relaxed by hot water of about 100° C., steam or hot blast. The tubular lining material obtained from the jacket thus treated had the following characteristics:

Jacket strength in terms of kg/cm:
    13 in peripheral direction
    42 in lengthwise direction
Weight of Tubular lining material: 120 g/m
Thickness of the Tubular lining material:
    0.6 mm in the resinous coating
    1.6 mm in the jacket
Expansion in diameter:
    53 mm under an inner pressure of 1.2 kg/cm$^2$
    58 mm under an inner pressure of 2.0 kg/cm$^2$
Elongation in lengthwise direction:
    10% under an inner pressure of 1.2 kg/cm$^2$
    30% under an inner pressure of 2.0 kg/cm$^2$
Pressure resistance: 3.2 kg/cm$^2$ Treatment of expansion in diameter:
    57–58 mm (under pressure)
    48–50 mm (after weaving)
    40 mm (on relaxing).

In another actual pipe-lining treatment for a pipe line of 250 mm in diameter, a tubular textile jacket was made of 3600 warps each made by twisting three 150 denier PBT crimped filaments and a weft made by twisting seven 150 denier PBT crimped filaments together with fourteen 150 denier woolly polyester filament and picked up at 15 pick count/inch. This tubular textile jacket was subjected to a relaxing treatment where the jacket was treated with hot water of about 100° C., steam or hot blast. The tubular lining material obtained from the jacket thus treated had the following characteristics:

Thickness of the tubular lining material:
    0.6 mm in the resinous coating
    2.5 mm in the jacket
Expansion in diameter:
    252 mm under an inner pressure of 0.6 kg/cm$^2$
    259 mm under an inner pressure of 1.0 kg/cm$^2$
Elongation in lengthwise direction:
    13% under an inner pressure of 0.6 kg/cm$^2$
    32% under an inner pressure of 1.0 kg/cm$^2$.

It is desirable that an elongation of the tubular lining material in the lengthwise direction be at least 10% under fluid pressure for evagination. As the lining material of the present invention has an elongation on tearing of 70–80%, the lining material is easily stretchable to 20% under a relatively low pressure exerted for evagination and can be passed smoothly within a pipe line without forming any wrinkles or space narrowing the flowpath on passing through a bend or curved portion of the pipe line. As the pressure for evagination is low enough, the lining material is not subjected to strong tension or stress so that its strength is not damaged during the lining treatment. Although any of the conventional pipe-lining methods is applicable to the tubular lining material of the present invention, the pressure required for evagination is as low as 0.5–2 kg/cm$^2$.

It is a unique characteristic feature of the present invention that the tubular lining material can be applied evenly onto the inner surface of a pipe line having an inner diameter as large as 300 mm because of high stretchability and flexibility of the lining material without taking a particular consideration on selection of the pipe-lining method. Further, the lining of the pipe lines having a number of bends can be carried out with the highly stretchable and flexible lining material of the present invention, as in the case of using a lining material based on polyurethane elastic yarns, without forming any wrinkle or space.

It is an additional advantage of the tubular lining material of the present invention that the tubular textile jacket is highly consistent because of using crimped yarns which are entangled with one another and provide sufficient spaces for absorbing a binder or a synthetic resin so that adhesion of the lining material onto the inner surface of a pipe line is fully assured. This effect is enhanced when crimped yarns are used also for weft. It is further advantage of the tubular lining material of the present invention that the stretchability of crimped yarns of PBT fibers is almost equivalent to that of Spundex fibers but the flexibility of the former is rather superior to that of the latter. Further, PBT fibers are much less expensive than Spundex fibers. Thus, the tubular lining material of the present invention is advantageous from the economical point of view.

The use of the highly stretchable and flexible tubular lining material of the present invention makes it possible for the first time to provide a pipe line having an inner diameter as large as 300 mm and possibly a number of bends therein with a lining material for reinforcement in good compliance with the complicate shape of the pipe line especially in bends without forming any wrinkles in the lining material or any space between the pipe line and the lining material which narrows the flow path, without the necessity of consideration on what pipe-lining method is to be selected. None of the prior art tubular lining materials can attain such remarkable technical merits in the pipe-lining treatment for a pipe line having an inner diameter as large as 300 mm and possibly a number of bends or curved portions in complicate shapes.

A pipe-lining method itself, a binder and a relaxing treatment of the tubular textile jacket can be selected suitably from the known conventional arts described in the references.

As many apparently widely different embodiments of the present invention may be made without departing from the spirit and scope thereof, it is to be construed that the present invention is not limited to the specific embodiments thereof except as defined in the appended claims.

What is claimed is:

1. A tubular lining material readily adaptable to a pipe line which has a relatively large inner diameter and which is either substantially straight or includes a plurality of bends or curved portions, in such a manner that said tubular lining material with a binder on the inner surface thereeof may inserted into the pipe line and allowed to advance within the pipe line with or without the aid of a leading rope-like elongated material while turning said tubular lining material inside out under fluid pressure thereby applying said tubular lining material onto the inner surface of the pipe line, with said binder being interposed between the pipe line and the tubular lining material, said lining material comprising a tubular textile jacket made of warps and a weft, knitted or woven in a tubular form, overcoated with an air-impervious coating of a flexible synthetic resin, said warps consisting essentially of crimped yarns of polybutylene terephthalate fibers and said weft consists essentially of a yarn of synthetic fibers.

2. A tubular lining material according to claim 1, wherein the weft consists essentially ofa yarn of polyethylene terephthalate fibers.

3. A tubular lining material according to claim 1, wherein the weft consists essentially of a yarn of polybutylene terephthalate fibers.

4. A tubular lining material according to claim 1, wherein the weft consists essentially of crimped yarn of said synthetic fibers.

5. A tubular lining material according to claim 4, wherein the weft consists essentially of a crimped yarn of polybutylene terephthalate fibers.

6. A tubular lining material acccording to claim 4, wherein the weft consists essentially of a blend of crimped yarns of polybutylene terephthalate and synthetic fibers.

7. A tubular lining material according to claim 1, wherein said lining material has an elongation of 10-80% in the lengthwise direction.

8. A tubular lining material according to claim 1, wherein an outer diameter of the tubular lining material is 80-100% of an inner diameter of a pipe line to be lined.

9. A pipe lined with a tubular lining material comprising said pipe having a relatively large inner diameter and a tubular lining material readily adapted to said pipe, said lining material comprising a tubular textile jacket made of warps and a weft, knitted or woven in a tubular form, overcoated with an air-impervious coating of a flexible synthetic resin, said warps consisting essentially of crimped yarns of polybutylene terephthalate fibers and said weft consists essentially of a yarn of synthetic fibers.

10. The textile jacket lined pipe of claim 9 wherein said pipe is substantially straight.

11. The textile jacket lined pipe of claim 9 wherein said pipe is inclusive of a plurality of bends or curved portions.

12. The textile jacket lined pipe of claim 9 wherein said tubular lining material has an outer diameter 80 to 100% of an inner diameter of said pipe.

* * * * *

UNITED STATES PATENT AND TRADEMARK OFFICE
CERTIFICATE OF CORRECTION

PATENT NO. : 4,684,556

DATED : August 4, 1987

INVENTOR(S) : Hisao OHTSUGA et al

It is certified that error appears in the above-identified patent and that said Letters Patent is hereby corrected as shown below:

On the title page at Item (73) Assignee

After "Tokyo Gas Co., Ltd., Tokyo" insert the assignee --Ashimori Industry Co., Ltd., Osaka-- and change "Japan" to --both of Japan--.

Signed and Sealed this

Fifth Day of December, 1989

*Attest:*

JEFFREY M. SAMUELS

*Attesting Officer*      *Acting Commissioner of Patents and Trademarks*